Nov. 6, 1951 H. P. LINDERS 2,573,976
STATOR WINDING MACHINE
Filed Jan. 12, 1946 3 Sheets-Sheet 1
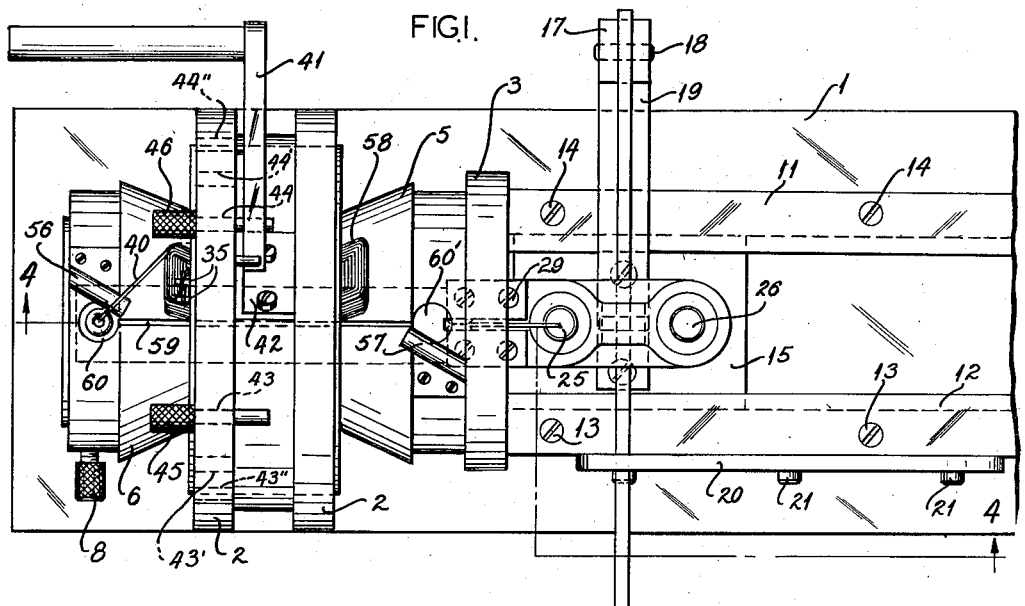
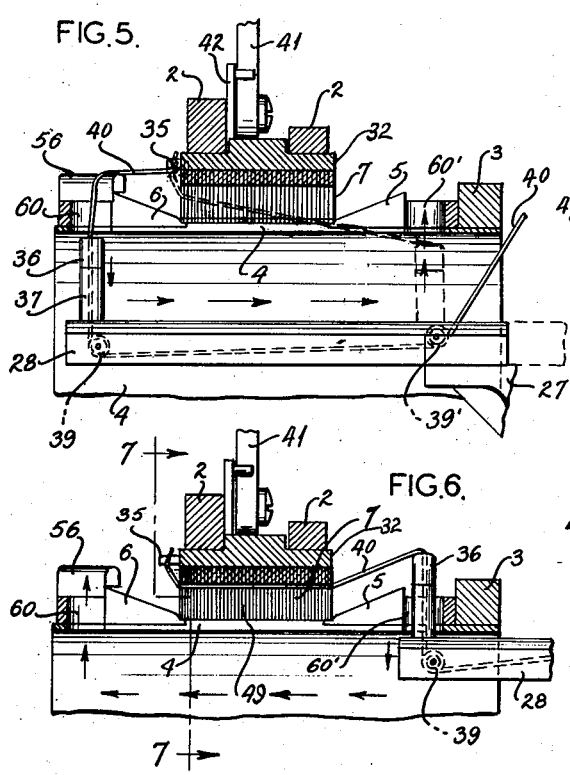
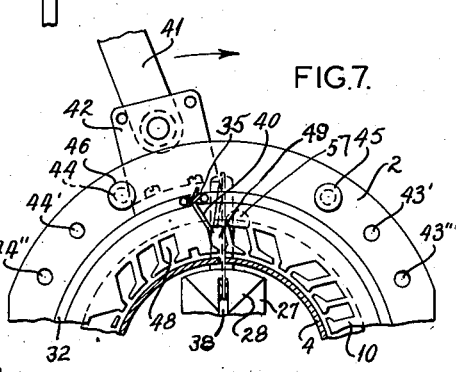
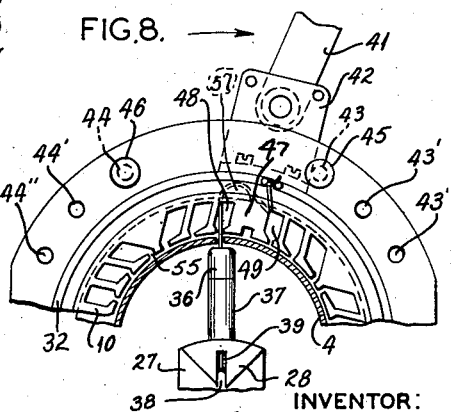
INVENTOR:
HARRY P. LINDERS
BY
ATTORNEY Nov. 6, 1951     H. P. LINDERS     2,573,976
STATOR WINDING MACHINE Filed Jan. 12, 1946     3 Sheets-Sheet 2

INVENTOR
Harry P. Linders
BY *[signature]*
ATTORNEY

Nov. 6, 1951 H. P. LINDERS 2,573,976
STATOR WINDING MACHINE
Filed Jan. 12, 1946 3 Sheets-Sheet 3
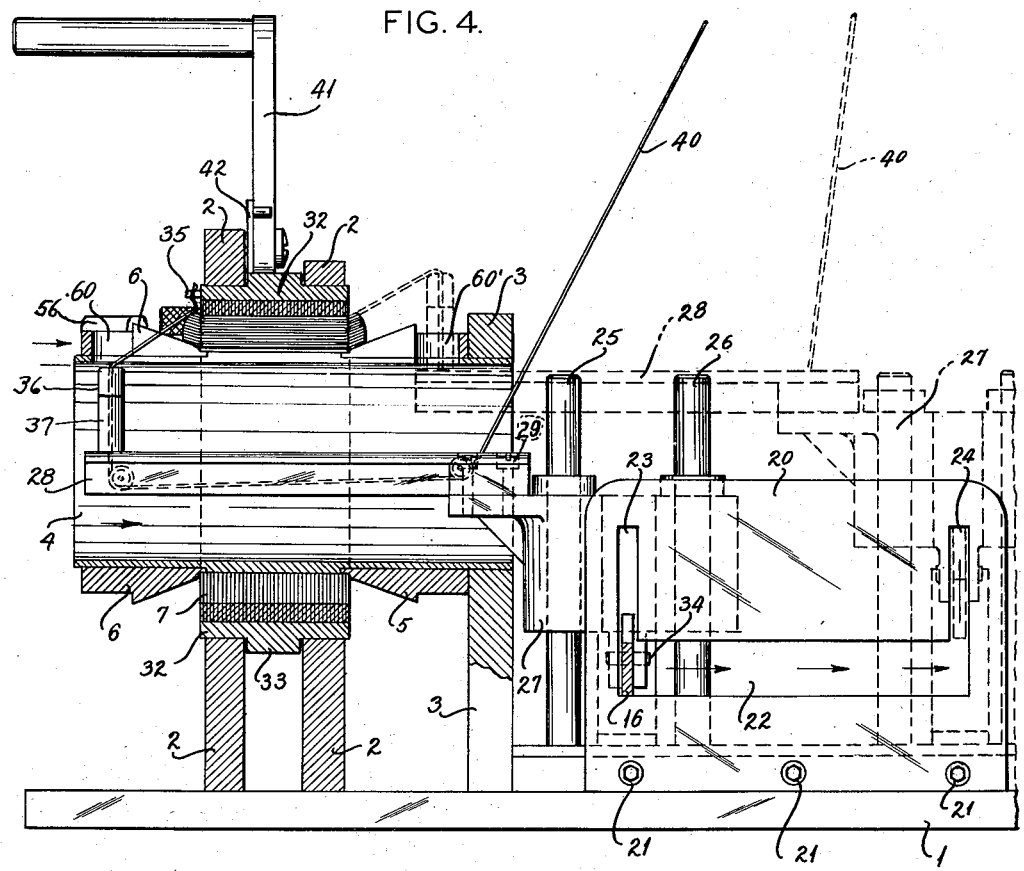
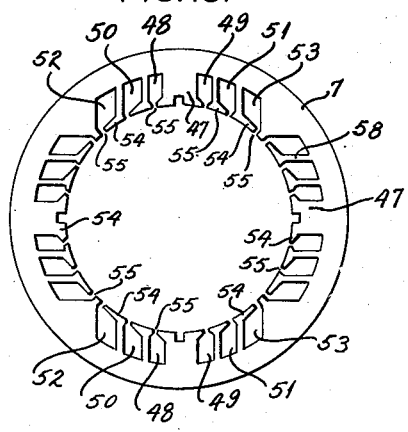
INVENTOR
HARRY P. LINDERS
BY
ATTORNEY Patented Nov. 6, 1951

2,573,976

UNITED STATES PATENT OFFICE 2,573,976

STATOR WINDING MACHINE

Harry P. Linders, Pine Lawn, Mo., assignor to Wagner Electric Corporation, St. Louis, Mo., a corporation of Delaware Application January 12, 1946, Serial No. 640,967

2 Claims. (Cl. 242—1)

This invention relates to stator winding machines and in its more specific aspects is directed to a method and mechanism for threading a conductor into suitably shaped slots in a stator core for electrical machinery.

One of the objects of this invention is to provide a coil winding machine for the stator core or pole piece in electro-dynamo machinery in which the conductor is threaded into the desired slots in the core and in which the segment of the conductor forming the ends of the coil is preformed before the conductor is threaded through the stator slot.

Another object of the invention is to provide a machine capable of preforming portions of windings and placing them in stator cores, which machine is equipped with an index mechanism to properly position a stator core to enable the conductor threading mechanism to place a conductor in any one of a plurality of core slots.

Still another object of the invention is to provide a coil winding machine for a stator core having a plurality of coils per pole piece and in which coil preforming devices are associated with the machine for partially preforming the ends of the coil before the shuttle or conductor threading device is reciprocated with respect to the stator core.

Various expedients in the art of coil winding have been employed in the past to wind the cores of stators for electro-dynamo machinery, some of which have involved the preliminary manufacture of the coil and its assembly prior to insertion into the stator. Other devices have been produced which manually wind the stator when assembled into the machine frame. This invention discloses a method and machine for the winding of a stator core having pole pieces therein which are wound with a plurality of serially connected coils and in which a portion of the individual turn of each coil is partially preliminarily shaped before being inserted in a stator slot as the conductor is withdrawn from a reel.

In the drawings Figure 1 is a plan view of a stator winding machine;

Figure 9:
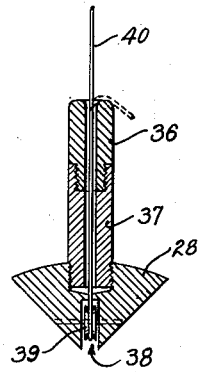

Figure 4 discloses a side elevation thereof with parts in section, taken along the line 4—4 of Figure 1;

Figure 5 shows the position of parts at the start of the winding operation;

Figure 6 shows the position of parts after one shuttle movement;

Figure 7 is a view taken along the line 7—7 of Figure 6 shown in the first index position;

Figure 8 shows the second index position of the index head;

Figure 9 is a sectional view of the conductor shuttle or threading device; and

Figure 10 is an elevational view of the stator core to be wound on the winding machine.

The above objects and advantages are obtained in the structure set forth in the accompanying drawings in which numeral 1 designates an appropriate base on which is mounted a stator supporting element preferably in the form of spaced apart members 2, 2. These members are secured near one end of base 1 by suitable screws or other appropriate expedients. A second support 3 is secured to plate 1 and is disposed a short distance away from supports 2, 2. A tapered or cone-shaped sleeve 5 is arranged on sleeve 4 (Figure 4), immediately adjacent support 3, for the purpose of circumferentially forming one end portion of a coil. A preforming die 57 is secured to sleeve 5 (Figure 1) for the purpose of partially preforming the section of the conductor which will form the end portion of the coil. The sleeve 4 extends through apertures in supports 2, 2 and a second tapered or cone-shaped sleeve 6 for the purpose of forming the other end portion of the coil is removably secured to the outer end of sleeve 4. A preforming die 56 (Figures 1 and 5) is secured to sleeve 6 whose function is identical with that of die 57. Sleeve 4 has suitable apertures 60, 60' arranged therein through which a suitable thimble may be moved radially relatively to sleeve 4, and a slit 59 connects the two apertures through which the conductor is threaded as the shuttle moves back and forth in order to place it in the desired coil slots.

Figure 3:
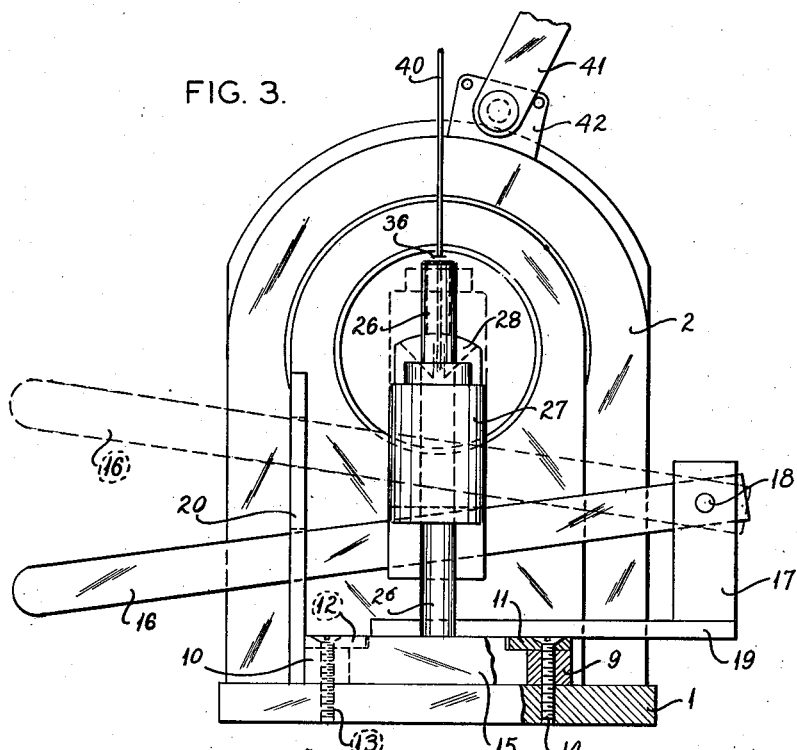
Figure 3 shows the elevation of the other end thereof.
Figure 2:
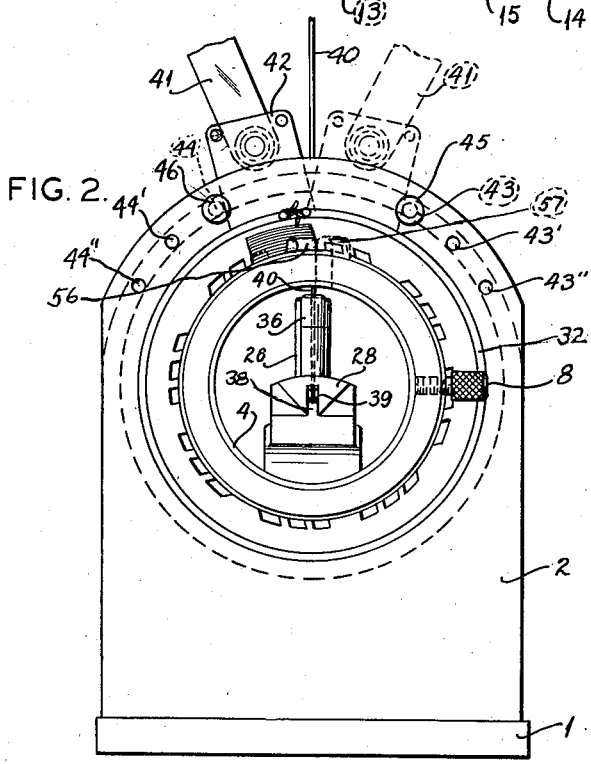
Figure 2 shows the elevation of one end thereof.

Extending rearwardly from support 3 on base 1 is a pair of spaced ways 9 and 10 (Figure 3) to which retaining elements 11 and 12 are secured and said ways and elements are secured to base 1 by suitable holding means such as screws 13 and 14. Arranged between ways 9 and 10 is a carriage or slide 15 guided therein for reciprocable movement longitudinally of base 1 toward and away from the sleeve support 3. Slide 15 is movable between ways 9 and 10 by means of a lever 16 pivoted on pin 18 to a support 17. Support 17 is rigidly secured to a member 19 which is secured to slide 15.

Arranged on one side of the machine, which may be designated as the operator's side, is a template 20 secured to way 10 by a plurality of screws 21. The template has a slot 22 (Figure 4)

therein, extending in the same direction as the slots in the stator core, in which the handle 16 slides, and slots 23 and 24, arranged at right-angles to slot 22, connect with the horizontal slot 22 to enable the handle or lever 16 to move therein about pin 18 as an axis. The length of slot 22 is equal to the length of stator 7 plus the extent of movement of die 36 (Figures 4, 5, and 6) past the ends of stator 7. The reasons for these handle movements will be subsequently set forth.

A pair of uprights 25 and 26 is secured to slide 15 preferably on opposite sides of member 19. Slidably mounted on uprights 25 and 26 is a shuttle or threading device which comprises a suitable casting or support 27 to which a longitudinally extended member 28 is secured by means of one or more screws 29 threaded into a suitable bracket integral with support 27. The support 27 is moved vertically on uprights 25 and 26 by handle 16 which is suitably connected to support 27 by a pin 34 (Figure 4). Member 28 is moved longitudinally with respect to sleeve 4 and ways 9 and 10 by handle 16. The member 28 constitutes a shuttle or conductor threading device to guide a wire into position in the slots of a stator core.

Arranged in the apertures in supports 2, 2 is a cylindrical sleeve member 32 having a collar 33 thereon which is arranged between supports 2, 2. The collar 33 prevents axial motion of sleeve 32 relatively to supports 2, 2 but sleeve 32 is permitted to move rotatably with respect to supports 2, 2. A conductor anchor 35 is secured to sleeve 32 in the position illustrated. The stator 7 is assembled in sleeve 32 about sleeve 4 and lies adjacent the tapered sleeve 5 and after the stator is in position, the tapered sleeve 6 is secured on sleeve 4 to lie adjacent stator 7. A suitable locking screw 3 is provided to lock sleeve 6 on sleeve 4. The diameter of the aperture in stator 7 is slightly larger than the outer diameter of sleeve 4 to allow a free and easy relative motion of the sleeve and stator.

The shuttle or threading device 28 has arranged at one end a member 36 through which conductor 40 passes, which is made up in the form of a drawing die, to prevent injury to the conductor and its insulation. This thimble is removably secured to a comparatively thick-walled section of tubing 37 (Figures 5, 8, and 9) threaded into member 28. The member 28 has a slot 38 on one side thereof in which a conductor guide in the form of a sheave 39 is rotatably supported. A similar sheave 39' is arranged at the opposite end of the shuttle device and said opposite end is slotted, through which slot a conductor 40 is passed which is then led about sheaves 39, 39' (Figure 5) through the thimble 36 and is then secured to anchor 35. Conductor 40 is drawn from a spool of wire supported on a reel (not shown).

A lever or handle 41 is secured to a fixture 42 which is fastened to the sleeve and collar members 32 and 33 by means of which said members are rotated in the apertures in supports 2, 2. One of the supports 2 is somewhat enlarged and there is provided in the enlarged support a plurality of apertures 43, 43', and 43'' on the one side and 44, 44', and 44'' on the other in which pins or stops 45 and 46 may be selectively positioned, depending upon which pair of slots in stator core 7 is having a coil wound therein. When apertures 43 and 44 have pins 45 and 46 inserted therein, the first coil is wound and when it is completed, they are then moved to the adjacent apertures 43' and 44' for the winding of the second coil and when they are moved to the third apertures 43'' and 44'' following the winding of the second coil, the third coil is wound. There are as many such apertures as there are coils per pole piece in the stator.

The stator shown in Figure 7 is made up of a laminated construction provided with a plurality of slots per pole piece, part 47 being regarded as the central member thereof on each side of which slots 48 and 49 are formed and slots 50, 51, 52, and 53 are arranged adjacent thereto, as illustrated in Figure 10. The sides of slots 48 and 49 are parallel to each other and also to the sides of slots 51, 53 and 50, 52. Each tooth 58 and each pole piece 47 has portions 54 formed on the ends thereof extending toward each other so that narrow slot openings 55 are provided which communicate with the interior of the respective slots, slot opening 55 being radial to the stator core and alignable with the conductor threading device. The stator slots are shaped as illustrated in order to place the maximum number of coil turns therein. Suitable insulation (not shown) is placed in each of the several stator slots after which the stator may be wound.

The operation of the winding machine begins by placing fixture 42 in the position shown in Figure 7 and then threading conductor 40 through the shuttle device 28 and thimble 36 and securing it to anchor 35. The slide 15 is assumed to be in the position shown in Figure 1 and in its radially outward position, that is, lever 16 is in the dotted line position of Figure 3. Thus die 36 extends through and beyond aperture 60 in sleeve 4 and lifts conductor 40 above preforming die 56. The center line of thimble 36 is now aligned with the radial opening 55 in slot 49 (Figure 7). Handle 16 is now lowered to the full line position of Figure 3, retracting thimble 36 and placing it within sleeve 4 and simultaneously causing die 56 to put a bend in conductor 40 (Figure 5). Slide 15 and shuttle 28 are then moved toward the right from the full line position of thimble 36 to the dotted line position shown in Figure 5. This movement causes conductor 40 to be drawn off preforming die 56, the bend therein facilitating its movement into the radial opening 55 and about the left end of the stator pole piece so that the conductor will assume the dotted line position of Figure 5. Shuttle 28 is now moved radially outward to the full line position shown in Figure 6 (dotted line position in Figure 7) to move thimble 36 into aperture 60' and to lift conductor 40 through slit 59 and radial opening 55 into slot 49 and above preforming die 57 by rotating handle 16 about pin 18 in slot 24. The stator 7 and its holder 32 are now rotated clockwise until fixture 42 engages with pin 45 inserted in aperture 43. This rotative motion will align shuttle die 36 with radial opening 55 of slot 48 (Figure 8). The shuttle device is now moved inward radially to the full line position of Figures 3 and 8, which motion will cause preforming die 57 to put a bend in conductor 40.

Slide 15 and shuttle 28 are now moved to the left to the position shown in Figures 1 and 4, causing conductor 40 to be drawn off preforming die 57 and simultaneously drawing the conductor about the right end of pole piece 47 (Figure 6), the bend placed therein by die 57 facilitating the entry of conductor 40 into slot 48 through its radial opening 55, shaping it about the right end of pole piece 47 and placing the conductor in slot 48 in a position comparable to that shown in Figure 5. As it is drawn about the right-hand end of pole piece 47, conductor 40 is simultaneously shaped circumferentially by tapered sleeve 5 which also supports the coil end during the winding operation. The shuttle is now moved radially outwardly through aperture 60 by moving handle 16 about pin 18 in slot 23, lifting conductor 40 above preforming die 56 and through slit 59 into slot 48 through its radial opening 55, the conductor assuming a position in slot 48 comparable to that shown in Figure 6. Stator 7 and its holder 32 are now rotated counter-clockwise until fixture 42 engages stop 46 and aligns shuttle thimble 36 with radial opening 55 of slot 49. Shuttle 28 is now moved radially inwardly and slide 15 and shuttle 28 are again moved toward the right and as conductor 40 is drawn off preforming die 56 into slot 49, it will again assume the dotted line position shown in Figure 5 at the end of the right-hand movement. Conductor 40 will be drawn about the left-hand end of pole piece 47 during such movement and the bend placed therein by preforming die 56, facilitates this action and tapered sleeve 6 will simultaneously circumferentially shape the end portion of the coil and also support the coil end during winding operations. Shuttle 28 and die 36 are now moved radially outwardly and the fixture 42 is placed in the position shown in Figure 8.

When a sufficient number of turns have been assembled in slots 48 and 49 in the manner described, the extent of rotational movement of the stator is then increased by positioning the pins 45 and 46 in apertures 43' and 44' so that slots 50 and 51 may be wound with a sufficient number of turns whereupon pins 45 and 46 are placed in apertures 43'' and 44'' so that slots 52 and 53 may be wound with a sufficient number of turns.

While the device is illustrated for the winding of one pole, it is understood that there may be as many shuttle devices 28 as there are poles in the stator core, thereby enabling the entire stator to be wound in a single operation of the machine. The manual operation set forth in the instant disclosure has been selected for reasons of simplicity in order to better portray the method and means by which the stator is wound and the coil ends preformed and shaped as winding progresses.

Having fully described my invention, that which I claim as novel and desire to protect by Letters Patent of the United States is:

1. A machine for laying the sides of a coil turn in an internally slotted stator core and for forming the free end portions of the coil turn formed from a wire conductor comprising a stator support in which the stator core is mounted; a second supporting means; a sleeve on said second means concentrically disposed in said stator holder; a thimble disposed in said sleeve; a slide on which said thimble is movably mounted with respect to said stator support to move said thimble axially with respect to said sleeve; means to move said thimble radially with respect to said sleeve; means supported on said sleeve to preform the portion of the conductor constituting the free end portion of the coil turn wound in the stator slots; and other means supported on said sleeve to substantially circumferentially shape and support the free end portions of the coil turn as it is wound in the stator slots.

2. A machine for laying the sides of a coil turn in an internally slotted stator core and for forming the free end portions of the coil turn formed from a wire conductor comprising a stator support in which the stator core is mounted; means on said base to rotatably support a stator holder; a slide reciprocably mounted with respect to said stator supports; a mechanism having a thimble thereon disposed within said means supported on said slide; means to radially move and to reciprocate said thimble relative to said stator holder; another support; a tubular element on said support concentrically disposed within said stator holder and having apertures therein through which said thimble on said shuttle may move in its radial movement; a pair of tapered sleeves on said tubular element to shape the free end portions of a coil turn wound in the stator core; and means on each of said tapered sleeves to preform a segment of conductor that is to form the free end portions of a coil turn, said means assisting in aligning the conductor with the next slot into which the conductor is to be placed.

HARRY P. LINDERS.

REFERENCES CITED

The following references are of record in the file of this patent:

UNITED STATES PATENTS

| Number | Name | Date |
| --- | --- | --- |
| 1,370,744 | Diehl | Mar. 8, 1921 |
| 1,595,396 | Herrick | Aug. 10, 1926 |
| 1,612,026 | Jannell | Dec. 28, 1926 |